(12) United States Patent
Cheng et al.

(10) Patent No.: US 8,196,217 B2
(45) Date of Patent: Jun. 5, 2012

(54) TIP-ENHANCED RESONANT APERTURES

(75) Inventors: Yao-Te Cheng, Yonghe (TW); Yin Yuen, San Francisco, CA (US); Paul C. Hansen, Palo Alto, CA (US); Yuzuru Takashima, Cupertino, CA (US); Lambertus Hesselink, Atherton, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 122 days.

(21) Appl. No.: 12/806,632

(22) Filed: Aug. 16, 2010

(65) Prior Publication Data

US 2011/0055984 A1    Mar. 3, 2011

Related U.S. Application Data

(60) Provisional application No. 61/274,301, filed on Aug. 14, 2009.

(51) Int. Cl.
    *G01Q 60/22*     (2010.01)
(52) U.S. Cl. .......................................... 850/32; 977/862
(58) Field of Classification Search ................ 850/24, 850/30–32
See application file for complete search history.

(56) References Cited

U.S. PATENT DOCUMENTS

| | | | |
|---|---|---|---|
| 6,995,367 B2 * | 2/2006 | Miyamoto | ............... 250/306 |
| 7,250,598 B2 | 7/2007 | Hollingsworth et al. | |
| 7,351,374 B2 | 4/2008 | Stark | |
| 7,423,265 B2 | 9/2008 | Matteo et al. | |
| 2005/0031278 A1 | 2/2005 | Shi et al. | |
| 2007/0230010 A1 * | 10/2007 | Jin et al. | ................... 360/69 |
| 2008/0149809 A1 * | 6/2008 | Hamann et al. | ............ 250/201.1 |

OTHER PUBLICATIONS

Taminiau et al. '$\lambda/4$ Resonance of an Optical Monopole Antenna Probed by Single Molecule Flurescence' Jul. 25, 2006, Nano Letters vol. 7, No. 1, p. 28-33.*
Frey et al. 'High-Resolution Imaging of Single Fluorescent Molecules with the Optical Near-Field of a Metal Tip' Nov. 12, 2004, Physical Review Letters vol. 93, No. 20.*
Kim et al., "Effect of polarization direction on the electric field distribution at the near-field of a tip-on-aperture near field scanning optical microscope probe", 2007, pp. 5577-5581, Japanese Journal of Applied Physics v46n8B.
Shi et al., "Design of a C-aperture to achieve lambda/10 resolution and resonant transmission", 2004, pp. 1305-1317, J. Opt. Soc. Am. B v21n7.
Sun et al., "Low-loss subwavelength metal C-aperture waveguide", 2006, pp. 3606-3608, Optics Letters v31n24.
Matteo et al., "Spectral analysis of strongly enhanced visible light transmission through single C-shaped nanoapertures", 2004, pp. 648-650, Applied Physics Letters v85n4.

(Continued)

*Primary Examiner* — Jack Berman
*Assistant Examiner* — Eliza Osenbaugh-Stewart
(74) *Attorney, Agent, or Firm* — Lumen Patent Firm

(57) ABSTRACT

Transmission efficiency and/or spatial resolution provided by resonant apertures can be enhanced by disposing a tip on part of the screen that extends laterally into the aperture. For example, a tip disposed on the ridge of a C-shaped aperture can dramatically improve performance. A spatial resolution of $\lambda/50$ has been experimentally demonstrated with this approach. The combination of high spatial resolution and high transmission efficiency provided by this approach enables many applications, such as near field optical probes for near field scanning optical microscopy (NSOM). Another application is high resolution electron sources, where an photoelectron emitter can be disposed at or near a tip+aperture structure such that the high resolution optical near-field provides a correspondingly high resolution electron source.

17 Claims, 9 Drawing Sheets

OTHER PUBLICATIONS

Veerman et al., "High definition aperture probes for near-field optical microscopy fabricated by focused ion beam milling", 1998, pp. 3115-3117, Applied Physics Letters v72n24.

Hutter et al., "Exploitation of localized surface plasmon resonance", 2004, pp. 1685-1706, Advanced Materials v16n19.

Taminiau et al., "Optical antennas direct single-molecule emission", 2008, pp. 234-237, Nature Photonics v2.

Frey et al., "Enhancing the resolution of scanning near-field optical microscopy by a metal tip grown on an aperture probe", 2002, pp. 5030-5032, Applied Physics Letters v81n26.

Tanaka et a., "Simulation of a novel tip-probe providing high intensity and small spot size with a small background light in nano-optics", 2005, Proc. 5th IEEE Conf. on Nanotechnology.

* cited by examiner

TIP-ENHANCED RESONANT APERTURES

CROSS REFERENCE TO RELATED APPLICATIONS

This application claims the benefit of U.S. provisional patent application 61/274,301, filed on Aug. 14, 2009, entitled "C-Aperture Nano-Tip (CAN-Tip)", and hereby incorporated by reference in its entirety.

FIELD OF THE INVENTION

This invention relates to sub-wavelength optical apertures.

BACKGROUND

In order to probe the nano-world optically, the diffraction limit has to be overcome. A round aperture can provide a nano-scale optical resolution on the order of the size of its opening; however, its low power throughput limits many applications. To improve the power throughput of nano-apertures, resonant nano-apertures, such as C-shaped apertures, have been developed. Resonant apertures can provide two to three orders of magnitude higher intensity than a round aperture, while maintaining comparable near-field spot sizes. An alternative approach for providing sub-wavelength resolution is using optical antennas, such as bow-tie antennas, which can concentrate optical energy at a sharp antenna feature. However, these approaches tend to also provide large background illumination, which also limits some applications.

A relatively recent approach is known as "tip-on-aperture" (TOA), as described by Frey et al. in an article entitled "Enhancing the resolution of scanning near-field optical microscopy by a metal tip grown on an aperture probe" (Applied Physics Letters v81n26, pp. 5030-32, 2002). In this work, a metal tip is disposed on an edge of a slit-shaped aperture, and high optical resolution combined with background free illumination is provided.

However, it remains desirable to provide high spatial resolution, low background illumination and high transmission efficiency for sub-wavelength structures that goes beyond what can be obtained using known approaches.

SUMMARY

To better appreciate the present work, it is convenient to first consider some geometrical aspects of apertures. A characteristic feature of apertures suitable for use with the present approach is that part of the screen extends laterally into the aperture to define the aperture shape. For example, ridge 106 of screen 102 on FIG. 1a extends laterally into a region having dimensions $H_t$ by $W_t$ to form a C-shaped aperture 104. Similarly, ridges 206a and 206b extend into bowtie aperture 204 on FIG. 2a, and ridges 306a and 306b extend into H-shaped aperture 304 on FIG. 3a. In these examples, the screen ridges extend laterally into a region having dimensions $H_t$ by $W_t$ to define the aperture shape. More generally, the part(s) of a screen regarded as "extending into" an aperture are the parts of the screen that are enclosed by the convex hull of the aperture. In the preceding examples, the convex hull of each aperture is a rectangle having dimensions $H_r$ by $W_r$. Thus, apertures which are convex (e.g., a round or rectangular aperture) do not have parts of the screen which extend into them. Determination of whether or not a ridge extends into the aperture as described above does not depend critically on the shape of the ridge. For example, FIG. 1a shows a C-aperture having a rectangular ridge 106, and FIG. 2a shows a bowtie aperture having triangular ridges 206a, 206b. A C-aperture having a triangular ridge (or ridge with any other shape) is also possible.

The convex hull of an aperture is the smallest convex shape that encloses the aperture. A shape is convex if and only if all points along a straight line between any two points in the shape are necessarily in the shape. A C-aperture is not convex, because a line between the top and bottom arms of the C will include points not in the aperture. Thus, the convex hull of a C-aperture is a rectangle aligned with the outer edges of the C-aperture, and this fact is not affected by the shape of the ridge of the C-aperture.

Transmission efficiency and/or spatial resolution provided by resonant apertures can be enhanced by disposing a tip at or near a charge concentration point of the resonant aperture. Charge concentration points of resonant apertures have been found to be located on parts of the screen that "extend into" the aperture as described above. A spatial resolution of $\lambda/50$ has been experimentally demonstrated with this approach.

One way to appreciate the advantages provided by the present approach is to consider two alternatives: (A) planar C-apertures, and (B) apertureless Near-field Scanning Optical Microscope (NSOM) probes.

A planar C-shaped nano-aperture has demonstrated that it is able to focus a visible or IR light to a $\lambda/10$ near-field spot with 1000× improvement in intensity relative to a square/circular nano-aperture. However, limited by the current fabrication technology, the smallest near-field spot at 10 nm away from the aperture that can be obtained is about 50 nm×50 nm. According to its resonance design, the near-field spot size increases with wavelength. For applications in the IR or THz range, a planar C-aperture can't concentrate the EM energy at a sub-100 nm scale.

In contrast, an apertureless NSOM probe can offer a ultra high optical resolution with a 1 to 10 nm tip radius of curvature and a near-field intensity proportional to 1/(radius of curvature)^2. However, the diffraction limited illumination from the side results in a large background light which limits many applications of apertureless NSOM probes.

A resonant aperture nano-tip can solve both of these problems and can also take advantage of these two methods at the same time. It is capable of an ultra high optical resolution with a near-field spot smaller than 15 nm×15 nm which is only proportional to the tip radius of curvature, as for the apertureless NSOM tip. Thanks to the efficient transmission of the resonant aperture, the near-field intensity provided by a resonant aperture tip nano-probe can be 5-10 times higher than a corresponding resonant aperture without the tip. Because the illumination is behind the aperture, the aperture blocks the background light and provides a background-free ultra-small optical near-field spot.

Additional advantages of the present approach include:
1) A wavelength-independent optical resolution, which can maintain ultra high resolution while increasing the resonant wavelength of the nano-aperture.
2) Efficiently coupling optical energy into an ultra small area with no background noise.
3) A resonant optical nano-antenna with an off-resonant nano-aperture can also provide a decent optical power throughput, which solves the difficulties in the fabrication of an optical nano-probe providing optical source with blue or ultra-violet wavelength.

The present approach can be used in many fields that need strong near-field intensity and ultra-high resolution such as Near-field Scanning Optical Microscopy, near-field nano-lithography, near-field optical recording, near-field photoluminescence inspection, Heat Assisted Magnetic Recording (HAMR), Surface Enhanced Raman Spectroscopy (SERS), single molecule fluorescence detection, optical trapping of nano-particles, nanometer-scale height sensing, bio-sensing, DNA sequencing, off-chip to on-chip interfacing for optical interconnect, nano laser ablation, nano rapid prototyping, etc. The present approach can enable devices such as nano optical light modulators, nano spatial light modulators, nano detector array and so on.

Some specific applications of interest include:
1) Near-Field Scanning Optical Microscope: The present approach can provide a high intensity and an ultra-small optical source or detector with resolution smaller than 15 nm.
2) Near-Field Nano-Lithography and Nano Laser Ablation: The present approach can provide an ultra high intensity and ultra high resolution optical source for patterning on materials either with a photoresist or by laser ablation on the materials.
3) Near-Field Optical Recording and Heat-Assisted Magnetic Recording (HAMR): The present approach can provide an ultra-small recording area, which can enhance the recording density more than 1500× compared to a Blu-ray Disc®.
4) Nano-scale electron source generation. Ultra-high near field optical resolution can be combined with an photoelectron emitter to provide an electron source with ultra-high resolution. Such an electron source may be applicable for lithography, inspection and metrology.

BRIEF DESCRIPTION OF THE DRAWINGS

FIG. 12b shows near field intensity spectra for the tip locations of FIG. 12a.

DETAILED DESCRIPTION

Figure 1A:
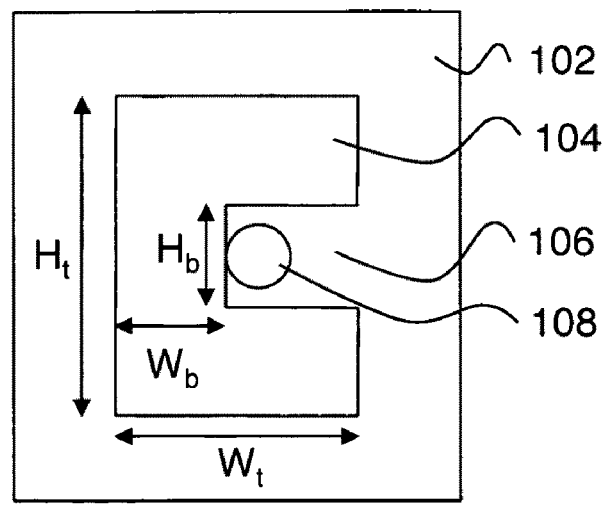
FIGS. 1a-b show a C-shaped aperture having a tip.
Figure 1B:
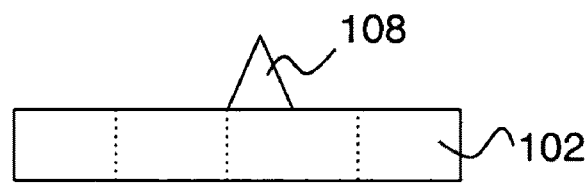

As indicated above, the present approach entails the use of a sub-wavelength antenna (i.e., a tip) in combination with a sub-wavelength resonant aperture, where the tip is located on a part of the screen that extends laterally into the aperture. Here, the term sub-wavelength refers to dimensions of λ/2 or less, where λ is a resonance wavelength of the aperture, accounting for the index of refraction if/as needed. FIGS. 1a-b, 2a-b and 3a-b show three examples. The example of FIGS. 1a-b relates to a C-shaped aperture. More specifically, a screen 102 (preferably metallic) has a sub-wavelength C-shaped aperture 104 in it. A part 106 of screen 102 extends laterally into the aperture. A sub-wavelength antenna (tip for short) 108 is disposed on part 106 of screen 102 and extends vertically from screen 102. FIG. 1a shows a top view of this structure, and FIG. 1b shows a corresponding side view.

Figure 2A:
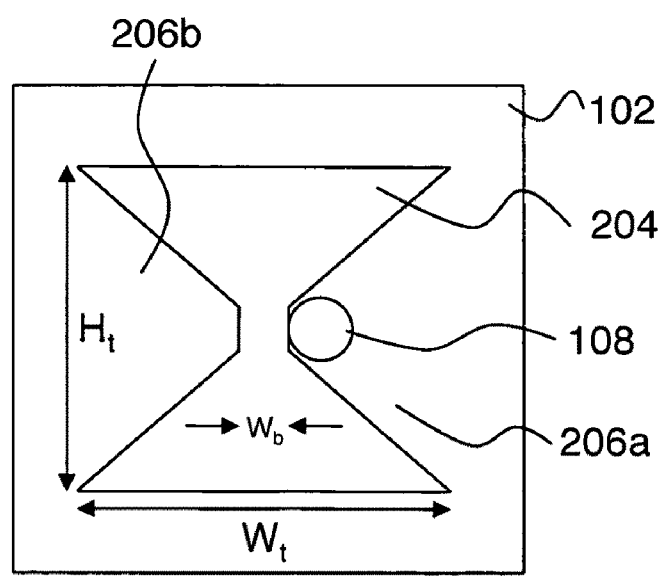
FIGS. 2a-b show a bowtie aperture having a tip.
Figure 2B:
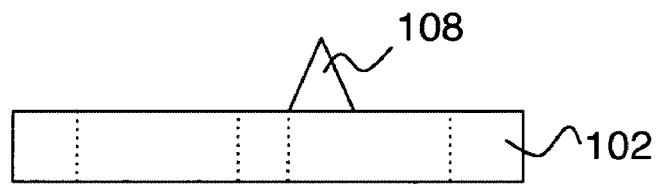

The example of FIGS. 2a-b relates to a bowtie aperture. More specifically, a screen 102 has a sub-wavelength bowtie aperture 204 in it. Parts 206a and 206b of screen 102 extend laterally into the aperture. A sub-wavelength antenna (tip for short) 108 is disposed on part 206a of screen 102 and extends vertically from screen 102. FIG. 2a shows a top view of this structure, and FIG. 2b shows a corresponding side view.

Figure 3A:
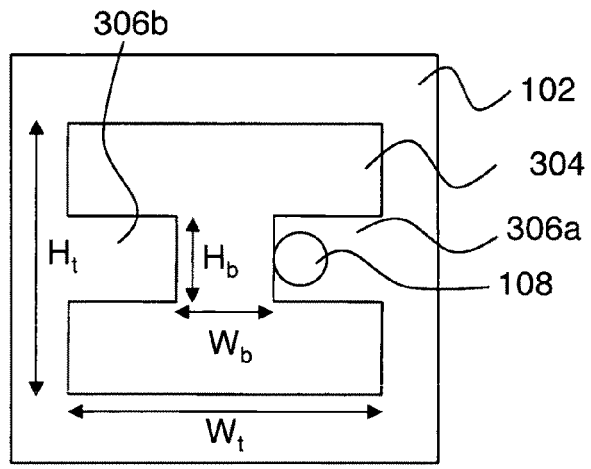
FIGS. 3a-b show an H-shaped aperture having a tip.
Figure 3B:
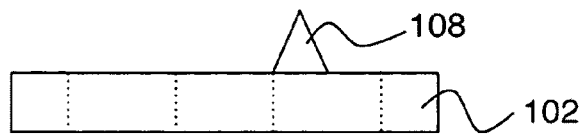

The example of FIGS. 3a-b relates to an H-shaped aperture (which can equivalently be regarded as being an I shaped aperture). More specifically, a screen 102 has a sub-wavelength H-shaped aperture 304 in it. Parts 306a and 306b of screen 102 extend laterally into the aperture. A sub-wavelength antenna (tip for short) 108 is disposed on part 306a of screen 102 and extends vertically from screen 102. FIG. 3a shows a top view of this structure, and FIG. 3b shows a corresponding side view.

Preferably, screen 102 has a thickness that typically is a few times (2-10×) larger than the skin depth and has a substantially uniform thickness, but surface roughness can provide additional throughput enhancement on the order of a 20-30%. The screen can be deposited as a layer on a non-planar substrate. Alternatively, the screen can be semi-transparent. It is also preferred for tip 108 to be entirely disposed on a part of the screen extending into the aperture. For example, the tip locations shown on FIGS. 1a-3b satisfy this condition. More generally, this can be regarded as a preference that the tip be disposed such that it is completely enclosed by the convex hull of the aperture.

Practice of the invention does not depend critically on the materials used for screen 102 and tip 108. Preferably, screen 102 and tip 108 are made of a material with metallic characteristics at the operating wavelength, which means that the real part of the electric permittivity of the material is negative. For optical frequencies, such metals include gold, silver and aluminum. Transverse electromagnetic fields incident on a metallic surface experience approximate Dirichlet boundary conditions, which, in conjunction with the shape of the aperture, lead to resonance and high field enhancement. In contrast, an ordinary dielectric material (with positive real permittivity) will not support these modes. It is also desirable for the imaginary part of the permittivity, which correlates with Ohmic losses, to be small at the operating frequency. Depending on the wavelength of interest, these considerations may lead to a natural choice of material for screen 102 and/or tip 108. Other arrangements are also possible, such as a dielectric tip in combination with an aperture in a metallic screen.

Materials as described above tend to support surface plasmon modes, and resonant transmission through the combined aperture and tip is often associated with a surface plasmon resonance condition. In these cases, resonant optical transmission through the aperture can be regarded as being surface plasmon resonant transmission. Preferably, tip 108 is tapered (or sharpened), so that concentrated surface charges can radiate even higher electromagnetic field around the point of the tip.

Practice of the invention does not depend critically on the operating wavelength (or, equivalently, operating frequency) selected. Preferably, a resonance wavelength of the apparatus is between about 100 nm and about 1 mm. This resonance wavelength depends on both the geometry of the structure and the materials employed.

Figure 4:
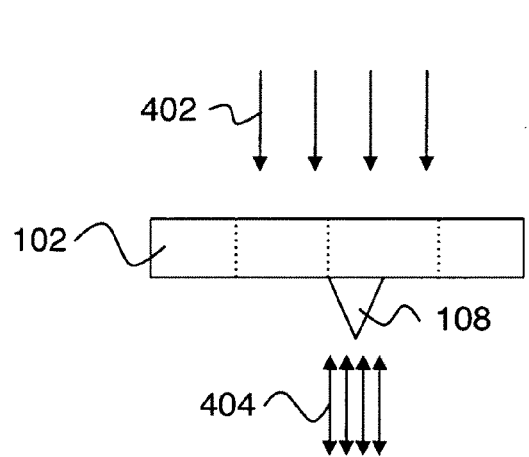
FIG. 4 shows a near field optical probe including a tip-enhanced resonant aperture.

FIG. 4 shows a near field optical probe including a tip-enhanced resonant aperture. In this example, radiation 402 is incident on a screen 102 that has a sub-wavelength resonant aperture in it (dotted lines in the side view of FIG. 4) and has a tip 108 disposed on part of the screen extending into the aperture. The combined effect of tip and aperture (at resonance) is to provide a highly concentrated electromagnetic near-field 404, which provides the high spatial resolution of the optical probe. As shown on FIG. 4, it is preferred for tip 108 to be disposed on a side of screen 102 that is opposite from incident radiation 402.

The polarization properties of this arrangement are noteworthy. More specifically, incident radiation 402 will be polarized perpendicular to arrows 402, while the near field 404 will tend to be polarized parallel to arrows 404 (i.e., parallel to the tip axis). The excitation mode for conventional linear nano-antennas is such that the incident energy is polarized along the length of the antenna, and propagates in a direction that is orthogonal to its polarization direction (i.e., the antenna is perpendicular to the incident radiation propagation direction). In sharp contrast, the antenna in a tip+resonant aperture structure is driven by localized charges transported across the metallic membrane by the resonant aperture; therefore, the orientation of the nano-antenna is directed along the direction of propagation of the excitation field. With reference to FIGS. 1a-3a, the incident polarization tends to be horizontal (i.e., parallel to the aperture ridges 106, 206a-b, 306a-b).

Figure 5A:
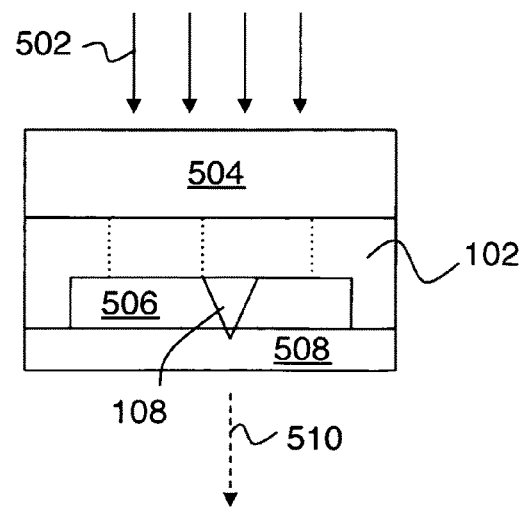
FIG. 5a shows an electron emitter including a tip-enhanced resonant aperture.

FIG. 5a shows an electron emitter including a tip-enhanced resonant aperture. In this example, radiation 502 is incident on a transparent substrate 504 (e.g., UV-grade fused silica). A resonant aperture (dotted lines in the side view of FIG. 5a) is disposed in screen 102 and a tip 108 disposed on part of the screen extending into the aperture. A photoelectron emitter 508 (e.g., CsBr) is disposed in proximity to tip 108. A filler material 506 (e.g. spin-on-glass) can be employed to fill in the region between screen 102 and photoelectron emitter 508 to provide mechanical robustness. In a preferred example of this application, incident radiation 502 is at 257 nm, and the optical spot size can be 20 nm or less.

Figure 5B:
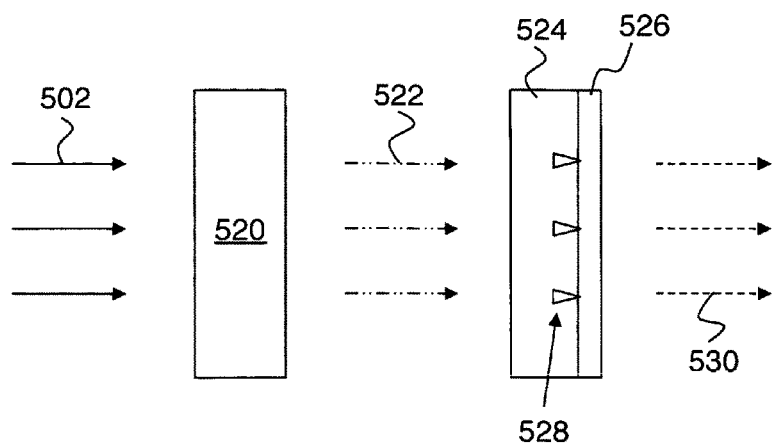
FIG. 5b shows an array of electron emitters based on tip-enhanced resonant apertures.

FIG. 5b shows an array of electron emitters based on tip-enhanced resonant apertures. In this example, radiation 502 passes through a spatial light modulator 520 to provide multiple radiation beams 522, each of which is individually modulated. The array of beams 522 is directed to a corresponding array of resonant tip+aperture electron emitters 528. This array of emitters can be disposed on a common substrate 524 and can include a common layer 526 of photoelectron emitter material. The output of this arrangement is an array of electron beams 530, each of which is individually modulated according to the modulation of its corresponding optical beam. Such an array of electron sources can provide increased throughput for electron beam lithography and scanning electron microscopy.

In practice, resonant aperture+tip combinations are often fabricated on a substrate (e.g., substrate 504 on FIG. 5a). The substrate material (usually a dielectric or semiconductor) has an effect on the resonance wavelength of the tip+aperture. This effect can be accounted for in detailed design of tip+aperture structures (e.g., using FDTD modeling).

Figure 6:
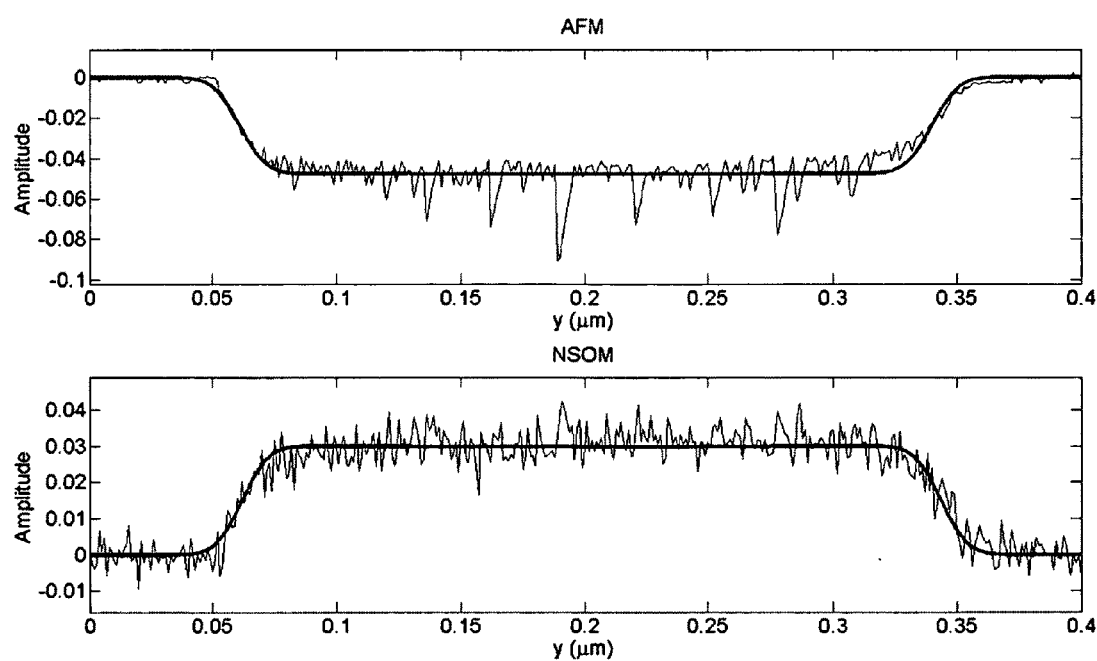
FIG. 6 shows experimental results comparing a near field optical scan to an atomic force microscope scan.

FIG. 6 shows experimental results comparing a near field optical scan to an atomic force microscope scan. The two traces on this figure show an atomic force microscope scan (top trace) and a NSOM scan (bottom trace). The NSOM scan was performed at a wavelength of 980 nm using a resonant C-aperture combined with a tip. The spatial resolution of the NSOM scan of FIG. 6 is about 20 nm, so an optical resolution of $\lambda/50$ has been experimentally demonstrated in the near-IR. Further details relating to this experiment follow.

In this experiment, the aperture dimensions were $H_b$=50 nm, $H_t$=150 nm, $W_t$=110 nm, and $W_b$=50 nm, where $H_b$, $H_t$, $W_t$, and $W_b$ are defined on FIG. 1a. The thickness of screen 102 was 200 nm, and the height of tip 108 was 150 nm. Tip 108 was disposed as indicated on FIG. 1a. The material for the screen and tip was gold. Finite-difference time-domain simulations of this structure predict a near-field enhancement larger than 500× with a full-width half-maximum near-field spot smaller than 20 nm.

Figure 7A:
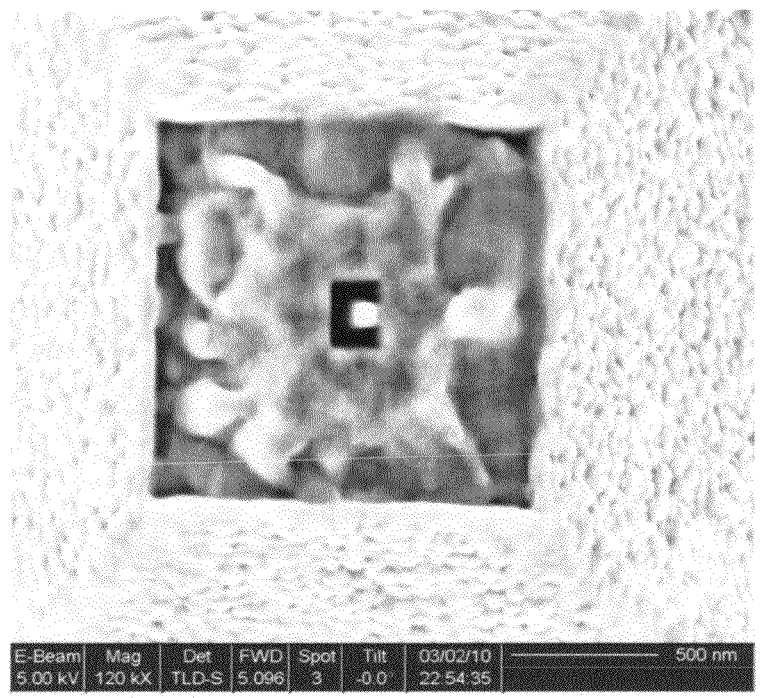
FIGS. 7a-b show SEM photographs of a fabricated C-aperture having a tip.
Figure 7B:
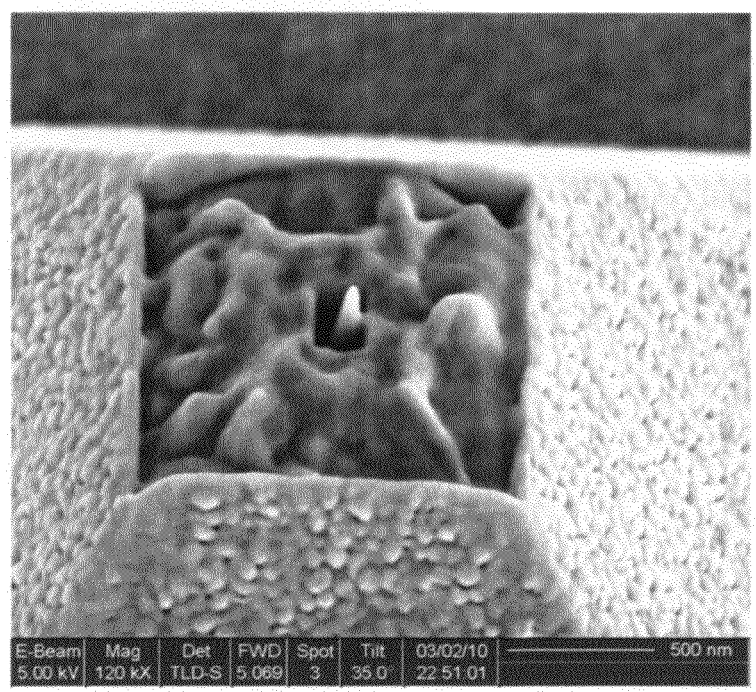

In order to verify the near-field optical spot generated by this structure, we used a custom built Near-field Scanning Optical Microscope (NSOM) with a resonant aperture+tip probe for near-field optical inspection. The resonant aperture+tip used in the scan was fabricated on a 100 nm thick pyramid-shaped silicon nitride membrane. It has a ~15-20 nm radius of curvature at the tip. Scanning electron microscope images of this probe are shown in FIGS. 7a-b. The silicon nitride membrane was aligned and glued to the end of a cleaved optical fiber (Corning HI-980) with UV-cured optical adhesive. The sample for the scan has 20 nm thick Cr nano-patterns fabricated with e-beam lithography lift-off process. The gap between the probe and sample surface was held constant using tuning fork based shear-force feedback.

While scanning, a 980 nm CW laser source was incident from the optical fiber with the polarization parallel to the ridge of the C-shaped aperture. An optical near-field spot was generated close to the tip of the probe. The scattered light was collected with a 0.4 NA microscope objective lens and recorded by a photodetector. Thanks to the sharp tip of the probe, a topography scan can be obtained from the tuning fork feedback response simultaneously with the optical signal. The results of FIG. 6 show the AFM/NSOM response when scanning over a 282 nm wide nano-disk. We assume that the Cr nano-disk has a rectangular shape for a single line scan and that the intensity profile of the near-field spot has a Gaussian distribution. The heavy lines in FIG. 6 show the convolution of a 20 nm FWHM Gaussian function with a 282 nm wide rectangular function and are used as fitting curves for the AFM/NSOM scan data. The fitting result shows that the near-field spot generated by the probe used in the scan was 20 nm in FWHM and was close to the radius of curvature of the tip.

Figure 8:
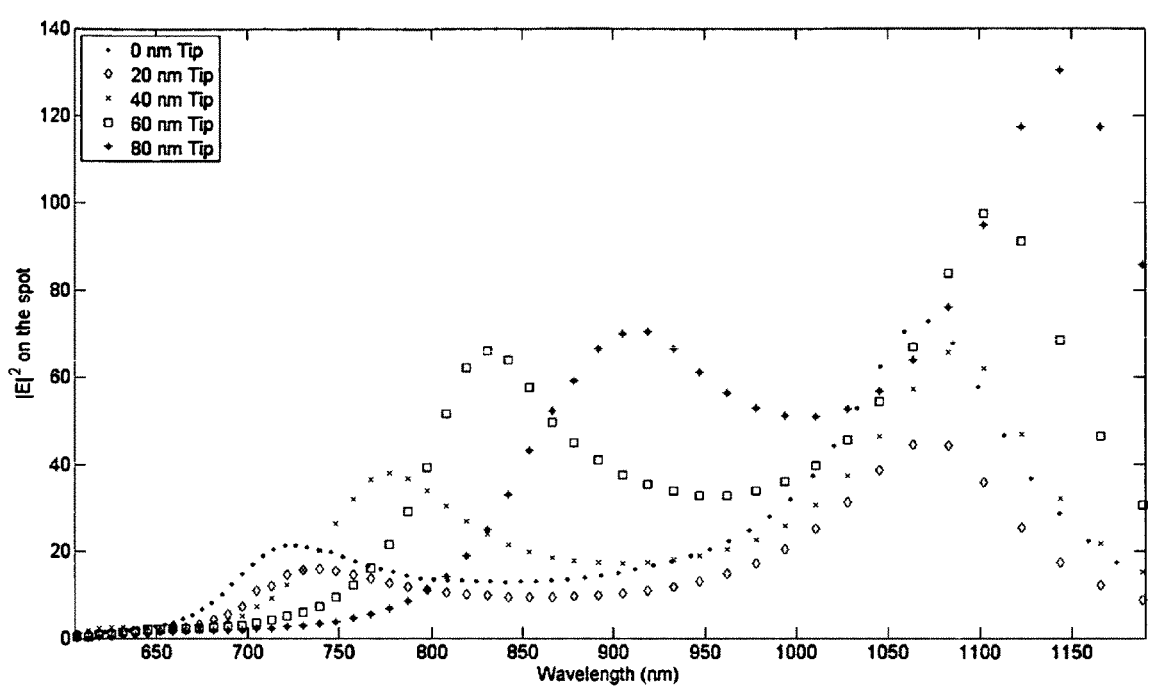
FIG. 8 shows near field intensity spectra for a C-aperture having various tip lengths.

The effect of the tip length on the design can be appreciated by considering several different tip lengths in connection with the same lateral aperture structure. FIG. 8 shows calculated near field intensity spectra for a C-aperture having various tip lengths. In this calculation, the aperture dimensions were $H_b$=70 nm, $H_t$=210 nm, $W_t$=154 nm, and $W_b$=70 nm, and the screen thickness was 200 nm. The tip was disposed as indicated on FIG. 1a. The 0 nm tip length in FIG. 8 corresponds to a planar C-aperture. As the tip length increases, the side resonance peak in the spectrum shifts to higher wavelengths. The design of the tip length can be combined with the thickness of the C-aperture. In addition, the tip increases the surface charge flow path length of a C-aperture, which also causes a small red-shift of the main peak (which is mainly determined by the lateral size of the C-aperture). As the tip length increases further, the side peaks tends to be merged with the main peak and the two peaks have higher and higher intensity at the near-field. The tip length can be designed to make the two peaks merged into one to get the highest near-field intensity. However, tuning the side peak off the main peak can offer two narrow band response or broad band response in the spectrum. These principles should also be applicable to any other resonant aperture shape.

Figure 9A:
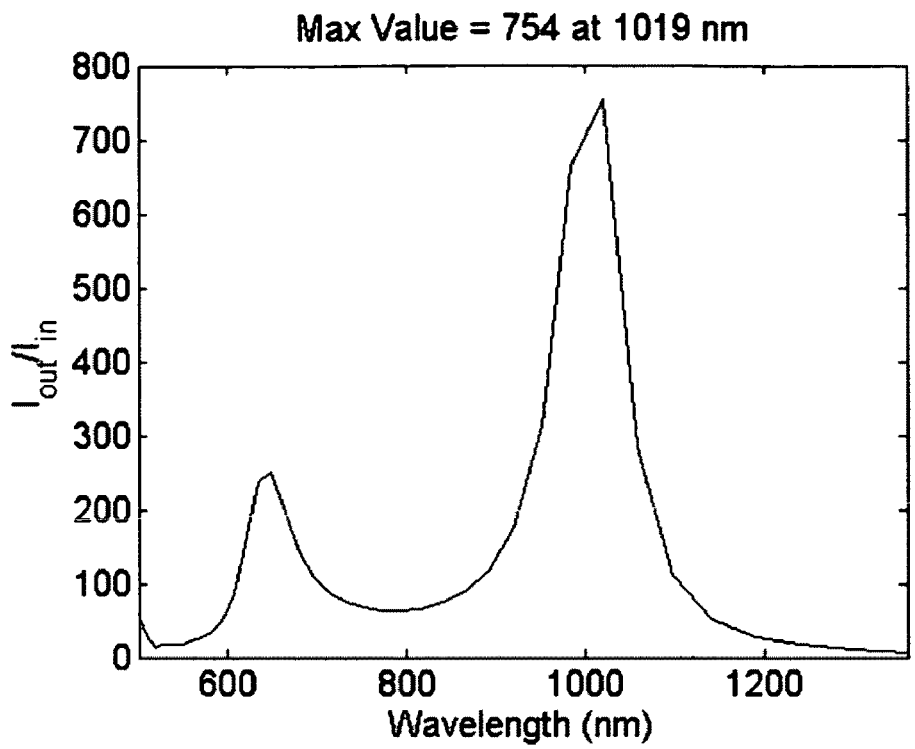
FIGS. 9a-b show near field intensity spectra for a C-aperture without a tip (FIG. 9a) and with a tip (FIG. 9b).
Figure 9B:
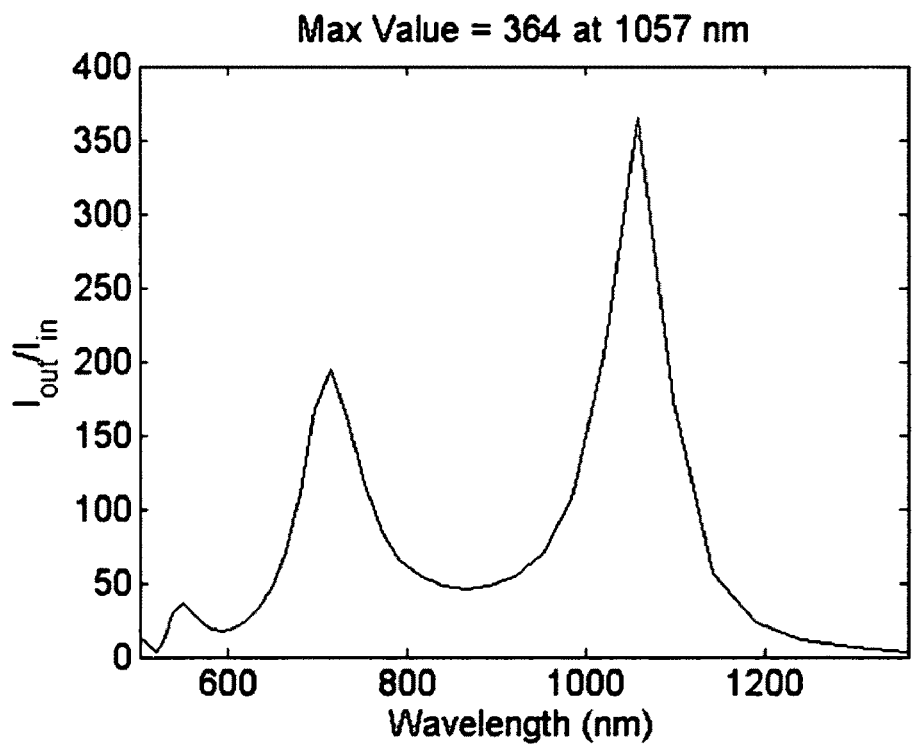
Figure 10A:
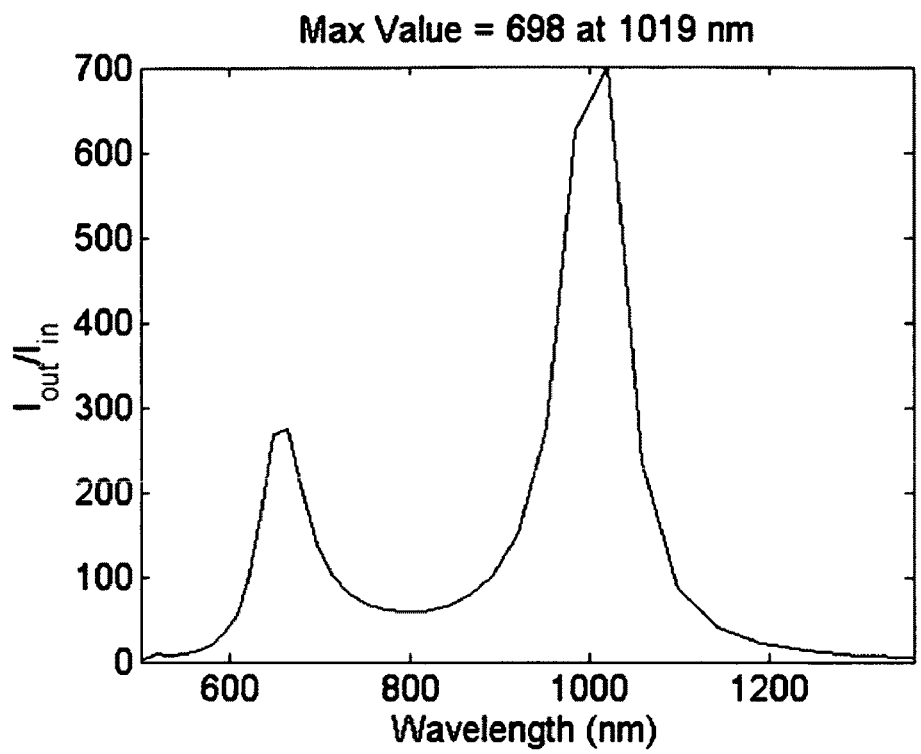
FIGS. 10a-b show near field intensity spectra for a bowtie aperture without a tip (FIG. 10a) and with a tip (FIG. 10b).
Figure 10B:
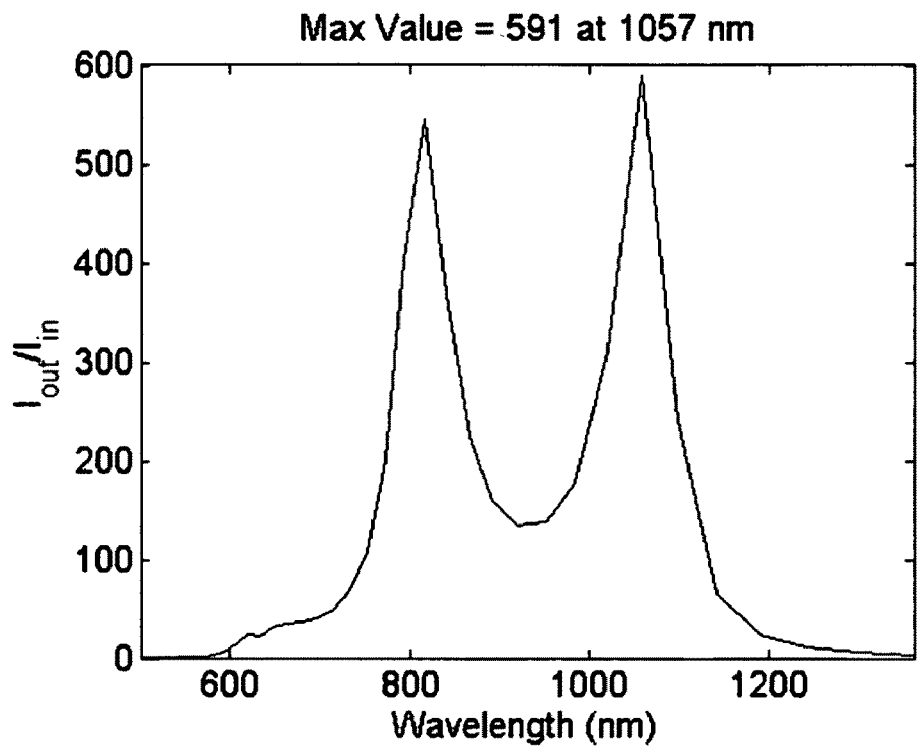
Figure 11A:
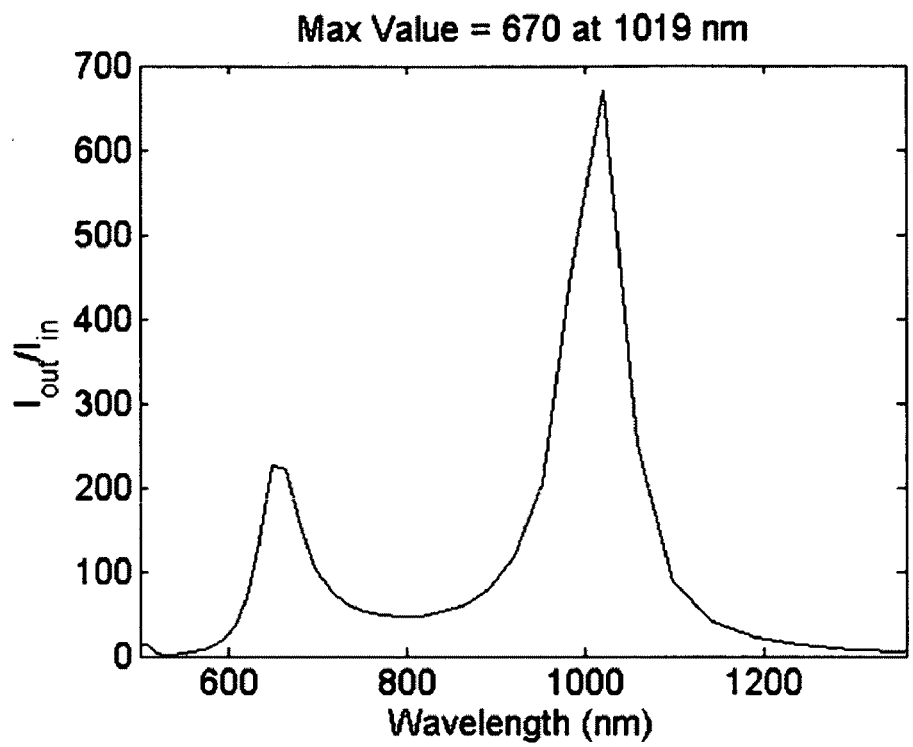
FIGS. 11a-b show near field intensity spectra for an H-aperture without a tip (FIG. 11a) and with a tip (FIG. 11b).
Figure 11B:
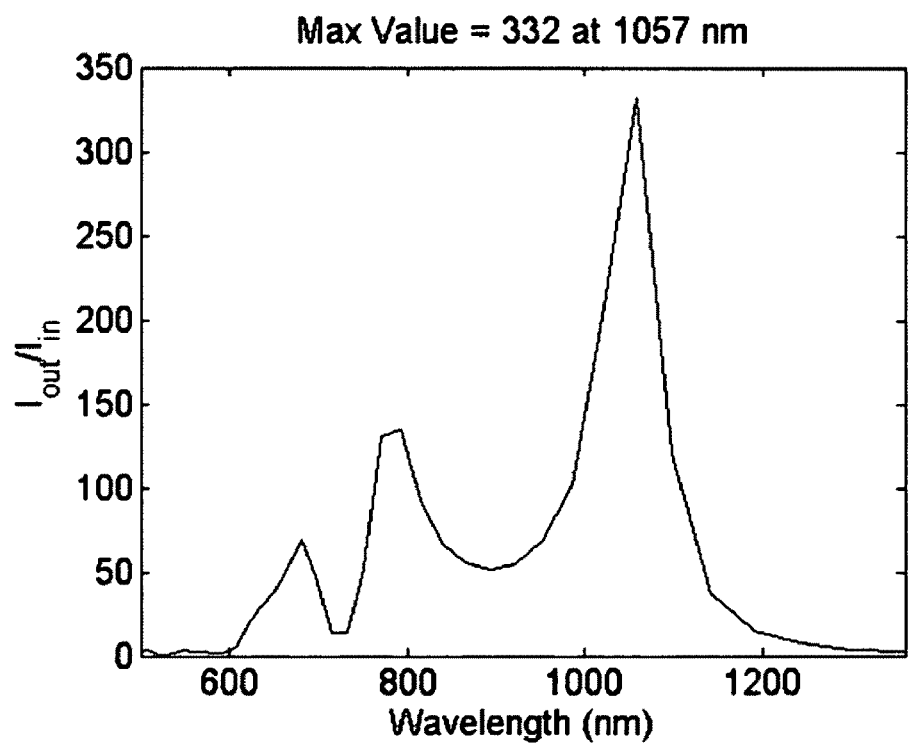

FIGS. 9a-11b show calculated near field intensity spectra for various apertures with and without a tip. More specifically, FIGS. 9a-b relate to a C-aperture, FIGS. 10a-b relate to a bowtie aperture, and FIGS. 11a-b relate to an H-aperture. FIGS. 9a, 10a, and 11a are results for configurations without a tip, and FIGS. 9b, 10b, and 11b are results for configurations with a tip. The nano-tip (nano-antenna) in each near-field transducer is disposed as shown on FIGS. 1a, 2a, and 3a (i.e., on a part of the screen that extends into the aperture). In the simulations, the C-aperture, the bowtie aperture, and the H-aperture have the same main resonance wavelength (1019 nm), and they all have 180 nm for the aperture thickness. For a 70 nm-long nano-tip attached to each nano-aperture, they all show the same red-shift of the main resonance peak from 1019 nm to 1057 nm. The second highest peak in each structure also shows the same trend in red-shift in the spectrum.

In addition, with a tip attached to each aperture, the near-field spot is much smaller than without a tip attached. For the C-aperture, adding the tip reduces the on-resonance spot FWHM from 22.5 nm×82.5 nm to 28.8 nm×28.8 nm. For the bowtie aperture, adding the tip reduces the on-resonance spot FWHM from 47.5 nm×50 nm to 28.3 nm×28.2 nm. For the H-aperture, adding the tip reduces the on-resonance spot FWHM from 20 nm×70 nm (2 spots) to 28.8 nm×28.6 nm (single spot). Further details of these calculations follow.

FIG. 9a shows the near-field intensity spectrum of a C-aperture, calculated at 5 nm away from the output side, opposite to light incidence. FIG. 9c shows the near-field intensity spectrum of a C-aperture+tip, calculated at 5 nm away from the tip. For these calculations, $H_b$=70 nm, $H_t$=210 nm, $W_t$=154 nm, $W_b$=70 nm, the screen thickness was 180 nm, and the tip height was 70 nm. The tip was disposed as indicated on FIG. 1a.

FIG. 10a shows the near-field intensity spectrum of a bowtie aperture, calculated at 5 nm away from the output side, opposite to light incidence. FIG. 10c shows the near-field intensity spectrum of a bowtie aperture+tip, calculated at 5 nm away from the tip. For these calculations, $H_t$=180 nm, $W_t$=180 nm, $W_b$=30 nm, the screen thickness was 180 nm, and the tip height was 70 nm. The tip was disposed as indicated on FIG. 2a.

FIG. 11a shows the near-field intensity spectrum of an H-shaped aperture, calculated at 5 nm away from the output side, opposite to light incidence. FIG. 11c shows the near-field intensity spectrum of an H-aperture+tip, calculated at 5 nm away from the tip. For these calculations, $H_t$=180 nm, $W_t$=204 nm, $H_b$=60 nm, $W_b$=60 nm, the screen thickness was 180 nm, and the tip height was 70 nm. The tip was disposed as indicated on FIG. 3a.

Several principles relating to the design of tip+resonant aperture structures have been identified to date. Such structures include two major parts: (1) a resonant aperture and (2) a nano-tip (nano-antenna). The dimensions for the resonant aperture and the nano-tip can be designed independently to get their own resonance transmission, but the two structures are also electromagnetically coupled to each other.

Previous investigations of a C-aperture have provided an optimized design having $H_b$=d, $H_t$=3d, $W_t$=2.2d, and $W_b$=d, where d is referred to as the characteristic dimension of the C-aperture. Accordingly, in C-aperture+tip structures, it is preferred for the aperture dimensions to be selected such that $2.5 H_b \leq H_t \leq 3.5 H_b$, $1.8 H_b \leq W_t \leq 2.5 H_b$, and $0.8 H_b \leq W_b \leq 1.2 H_b$.

Upon light illumination on a C-aperture of a perfect electric conductor (PEC) material, surface current is generated and flows back and forth along the perimeter and between the back and ridge of the C-aperture. For the resonance design, the path length that the surface current flows is designed to be about half of the wavelength of the incident light. At the resonance, surface charges pile up at both the back and ridge of the C-aperture and cause a strong near-field at the ridge. For a real metallic C-aperture, because of the finite skin depth of a real metal, the surface current flow path length is somewhat smaller than half of the wavelength of light incidence. C-apertures can be designed using finite-difference time-domain (FDTD) modeling. The transmission resonance wavelength increases with the characteristic size d of a C-aperture.

Generally speaking, a C-aperture can also be called a short C-shaped waveguide, which offers efficient transmission of light at a sub-wavelength area. Because the surface charges bounce back and forth between the two ends of the C-waveguide (C-aperture) upon light illumination, different thickness of C-apertures have their own resonance transmission wavelengths. Normally, in a near-field spectrum of a C-aperture, there are two or more resonance peaks. In the example of FIG. 9a, the main peak occurs around 1019 nm and is determined by the characteristic size of a C-aperture, d. The side peak in FIG. 9a which occurs around 650 nm is determined by the thickness of a C-aperture, t, and red-shifts with increasing aperture thickness.

Figure 12A:
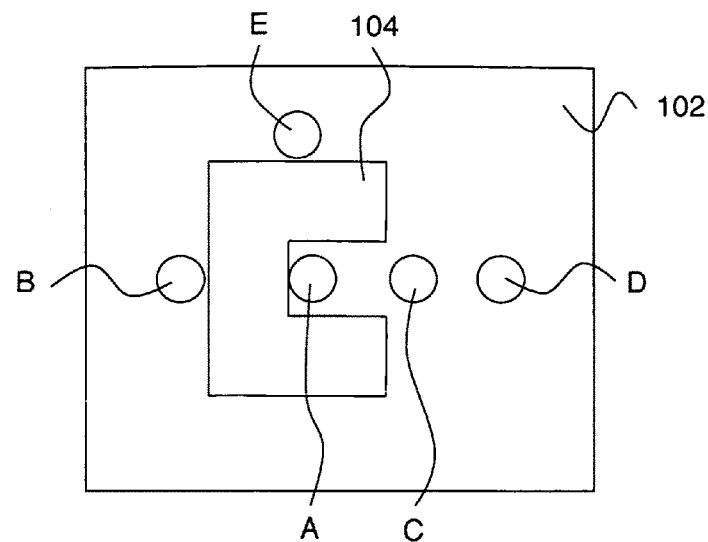
FIG. 12a shows several different tip locations relative to a C-shaped aperture.

The effect of tip location on performance has also been investigated using FDTD simulation. These results show that having the tip located on part of the screen that extends into the aperture is important for achieving high performance. FIG. 12a shows five different tip locations relative to a C-shaped aperture 104 in a screen 102. For case A, the tip is disposed on part of the screen that extend into the aperture as described above. For cases B, C, D, and E, the tip is located at various other positions, none of which are on part of the screen extending into the aperture. More specifically, the tip is located at the back of the C-aperture for case B, at the right of the C-aperture for case C, 70 nm to the right of the case C tip location for case D, and at the top of the C-aperture for case E. A tip located at the bottom of the C-aperture will give the same results as for case E, by symmetry. For all five cases, $H_b$=70 nm, $H_t$=210 nm, $W_t$=154 nm, $W_b$=70 nm, screen thickness=180 nm, and tip height=70 nm in the simulations.

Figure 12B:
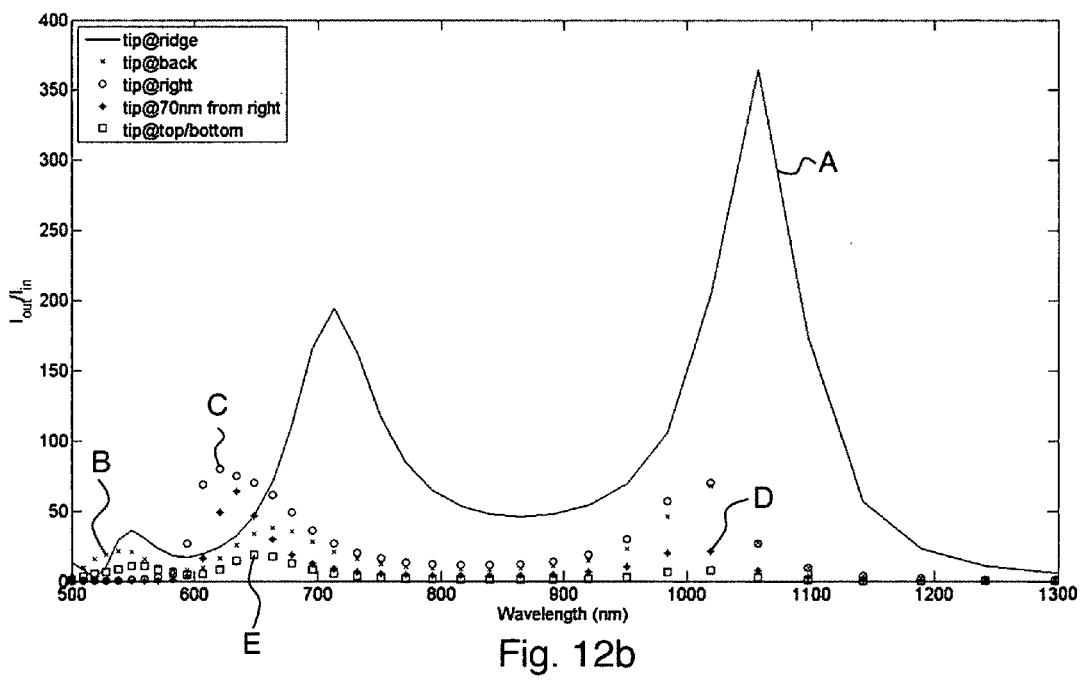

FIG. 12b shows the near-field intensity spectra of the designs of FIG. 12a. When the tip is located at the ridge of a C-aperture (case A), the near-field intensity is much larger than the other designs. The resonance peak also shifted from 1019 nm to 1057 nm in this case, which shows a combined resonance between the C-aperture and the tip, and it offers a higher efficiency of charges coupling onto the tip. Thus, transmission efficiency for case A is much higher than for cases B, C, D, and E.

Near-field intensity profiles of each design have also been computed. In most cases, the near-field spot size from the tip is not a strong function of tip location. However, the efficiency of coupling the near-field with the tip affects whether there is leakage from the C-aperture. When the tip is at the ridge (i.e., case A), there is almost no background from the C-aperture, which shows an efficient focusing of the near-field energy by the nano-tip. When the tip is at the back (case B) and the right (case C), weak C-aperture leakage shows up and increases when the tip is away from the C-aperture (case D) because the coupling becomes weaker. When the tip is located where the C-aperture doesn't provide a concentrated near-field or the tip is away from one end of the resonant surface current path (e.g., as in case E), the nano-tip can hardly couple with the near-field generated by the C-aperture and the near-field spot size is much larger than in the other cases.

These results show that having the tip location be on part of the screen extending into the aperture is important for providing high spatial resolution combined with high transmission efficiency.

The invention claimed is:

1. Apparatus comprising:
    a screen including a sub-wavelength aperture, wherein at least one part of the screen extends laterally into the aperture;
    a sub-wavelength antenna extending vertically from the screen and disposed on one of the parts of the screen extending into the sub-wavelength aperture.

2. The apparatus of claim 1, wherein resonant optical transmission through the aperture is surface plasmon resonant transmission.

3. The apparatus of claim 1, wherein light is incident on a first surface of the screen and the sub-wavelength antenna is disposed on a second surface of the screen opposite the first surface.

4. The apparatus of claim 1, wherein light incident on the screen is polarized substantially parallel to the screen, and wherein light emitted from the sub-wavelength antenna is polarized substantially perpendicular to the screen.

5. The apparatus of claim 1, wherein the screen has a skin depth and has a thickness that is in a range from about 2× the skin depth to about 10× the skin depth.

6. The apparatus of claim 1, wherein the screen has a substantially uniform thickness.

7. The apparatus of claim 1, wherein the sub-wavelength antenna is entirely disposed on one of the parts of the screen extending into the sub-wavelength aperture.

8. The apparatus of claim 1, wherein a resonance wavelength of the apparatus is between about 100 nm and about 1 mm.

9. The apparatus of claim 1, wherein a length of the sub-wavelength antenna and a thickness of the screen are selected such that a near-field transmission intensity spectrum of the apparatus has two peaks.

10. The apparatus of claim 1, wherein a length of the sub-wavelength antenna and a thickness of the screen are selected such that a near-field transmission intensity spectrum of the apparatus has a single peak.

11. The apparatus of claim 1, wherein the sub-wavelength aperture has a C shape, an I or H shape, or a bowtie shape.

12. A near-field optical probe including the apparatus of claim 1.

13. An electron emitter comprising the apparatus of claim 1, and further comprising a photoelectron emitter disposed in proximity to a tip of the optical antenna.

14. An array of electron emitters including two or more electron emitters according to claim 13.

15. A method for making a near-field optical probe configured to provide a sub-wavelength near-field spot, the method comprising:
    providing a screen including a sub-wavelength aperture, wherein at least one part of the screen extends laterally into the aperture; and
    disposing a sub-wavelength antenna extending vertically from the screen on one of the parts of the screen extending into the sub-wavelength aperture.

16. The method of claim 15, wherein a length of the sub-wavelength antenna and a thickness of the screen are selected such that a transmission intensity spectrum of the near-field spot has two peaks.

17. The method of claim 15, wherein a length of the sub-wavelength antenna and a thickness of the screen are selected such that a transmission intensity spectrum of the near-field spot has a single peak.

* * * * *